US006600923B1

(12) United States Patent
Dzuban

(10) Patent No.: US 6,600,923 B1
(45) Date of Patent: Jul. 29, 2003

(54) METHOD AND COMMUNICATION NETWORK FOR ADMINISTERING SUBSCRIBER DATA, PARTICULARLY SERVICE DATA

(75) Inventor: Stanislav Dzuban, Wien Österreich (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/423,020

(22) PCT Filed: Apr. 22, 1998

(86) PCT No.: PCT/DE98/01128

§ 371 (c)(1),
(2), (4) Date: Oct. 28, 1999

(87) PCT Pub. No.: WO98/49840

PCT Pub. Date: Nov. 5, 1998

(30) Foreign Application Priority Data

Apr. 30, 1997  (DE) .......................................... 197 18 445

(51) Int. Cl.[7] .............................................. H04Q 7/20
(52) U.S. Cl. ...................... 455/433; 455/461; 455/432; 455/435
(58) Field of Search ................................ 455/433, 435, 455/437, 414, 415, 417, 445, 432, 461, 412, 403, 550, 560

(56) References Cited

U.S. PATENT DOCUMENTS

| 5,142,654 A | * | 8/1992 | Sonberg et al. ............. 455/433 |
| 5,237,612 A | * | 8/1993 | Raith ......................... 455/411 |
| 5,557,655 A | * | 9/1996 | Lantto ........................ 455/433 |
| 5,577,103 A | * | 11/1996 | Foti ........................... 455/412 |
| 5,943,619 A | * | 8/1999 | Coyne et al. ................ 455/432 |
| 6,038,445 A | * | 3/2000 | Alperovich et al. ......... 455/422 |
| 6,085,105 A | * | 7/2000 | Becher ........................ 455/414 |

FOREIGN PATENT DOCUMENTS

DE  44 17 779 C1  12/1995

OTHER PUBLICATIONS

Smith, David G., "An Introduction to GSM Enhancements for Operator Specific Services (Camel)", IEE Colloquium on Mobile Communications Towards the Next Millennium and Beyond, (1996), pp. 6/1–6/9.

* cited by examiner

Primary Examiner—Dwayne Bost
Assistant Examiner—Sonny Trinh
(74) Attorney, Agent, or Firm—Morrison & Foerster LLP

(57) ABSTRACT

The method and the communication network according to the subject matter of the invention for administering subscriber data provides that an interface (HaHb-IF) via which information (FM, B#) for selecting outside subscriber data can be transmitted is respectively established between one's own memory unit (HLRa) responsible for a subscriber (A) and another memory unit (HLRb). The interface implemented between one's own memory unit and another memory unit not only enables a communication connection to one's own memory unit for the subscriber in a simple way but also enables a communication connection therefrom to another, central data base having outside subscriber data. Thus, the information—in a container message on the basis of a subscriber self-input for a specific service (follow me)—can thus be forwarded to the outside memory unit in order to select the subscriber data of the other subscriber—to have the service data of this service registered for the other subscriber in his memory unit.

22 Claims, 4 Drawing Sheets

Figure 1:
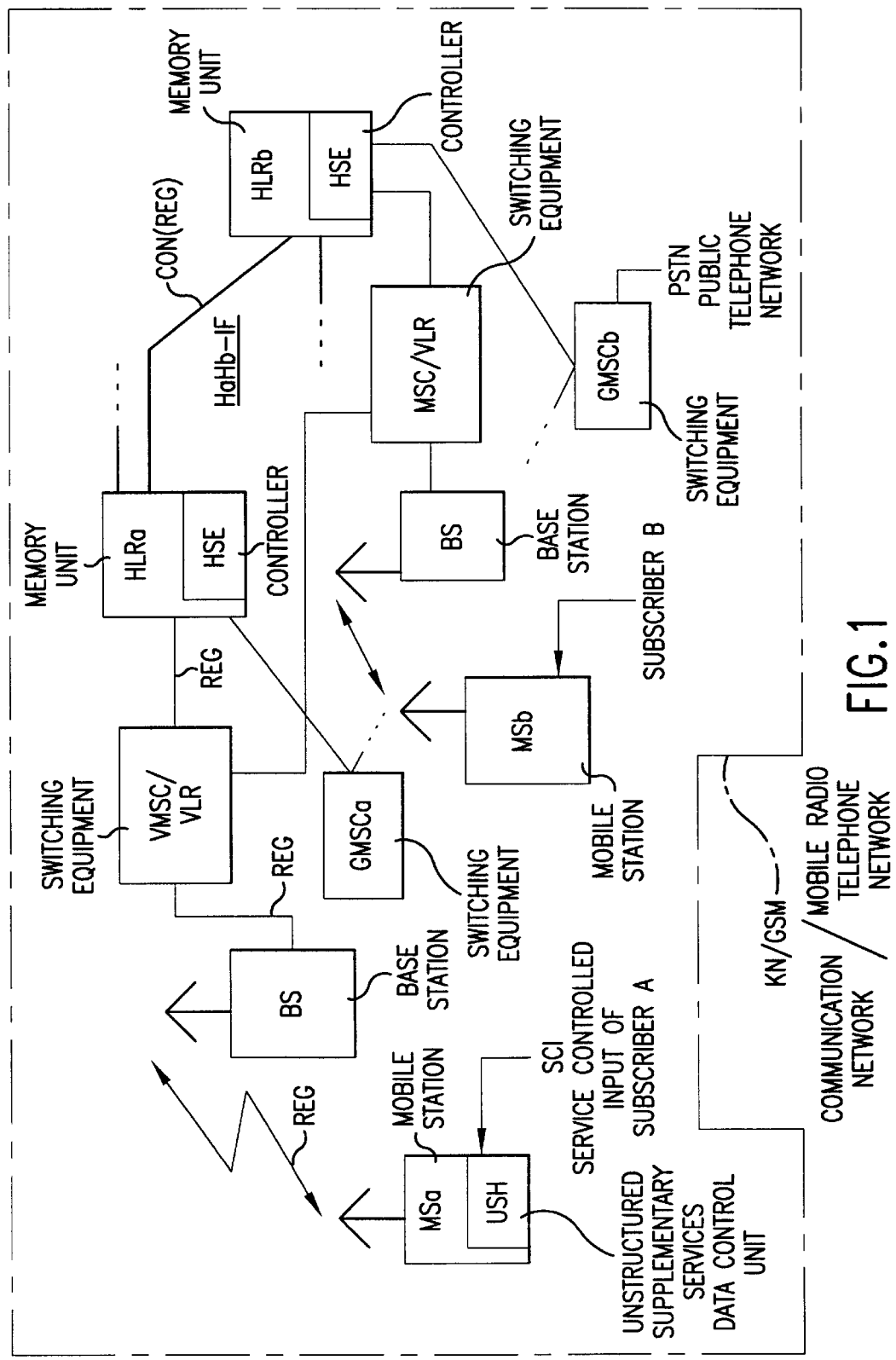

METHOD AND COMMUNICATION NETWORK FOR ADMINISTERING SUBSCRIBER DATA, PARTICULARLY SERVICE DATA

The invention is directed to a method for administering subscriber data for subscribers of a communication network and is also directed to a corresponding communication network.

Communication networks, for example, are fashioned as fixed network or as mobile communication systems such as the known GSM mobile radio telephone network (Global System For Mobile Communications) and exhibit switching equipment networked with one another. In mobile radio telephone networks, respective base stations are connected to the switching equipment, communication terminal equipment being connectible with these base stations via an air interface. These communication terminal equipment referred to as mobile stations enable network access for a mobile subscriber of the communication system. Over and above this, the switching equipment effect the transition to other networks, for example data transmission networks or to a fixed network.

It is also known from the GSM mobile radio telephone network to employ memory units wherein subscriber-specific data are respectively stored for the in-network services. One of these memory units is the home register that, as central data base, is usually located at a permanently defined location and in which the subscriber data on which the registration of the subscriber are deposited, including the service data of service data [sic] respectively registered for the subscriber. Given, for example, calls for the subscriber, the memory unit is thus interrogated at the network side with respect to its subscriber data that are required for further call handling. On the basis of a subscriber self-input into the mobile station, the subscriber can select the data in his own memory unit in order, for example, to activate/deactivate the call rerouting to an announcement (in his voice mail box).

Over and above this, it is notoriously known to have services administered by service control points of a communication network, for example a fixed network, supporting the network structure of an intelligent network. The service control points are thereby respectively fashioned as independent control devices and are usually connected to a switching equipment.

German Letters Patent DE 44 17 779 C1 discloses a mobile radiotelephone system wherein, when a mobile subscriber passes from a first mobile radiotelephone area into a second mobile radiotelephone area, the subscriber is serviced with his own subscriber data by the home register arranged in the new area.

An object of the invention is to also enable access to the subscriber data of other subscribers for subscribers of a communication network that have their subscriber data respectively entered in their own memory unit.

This object is inventively achieved by the features of patent claim 1 in view of the method and by the features of patent claim 18 in view of the communication network. Advantageous developments of the invention can be derived from the subclaims.

The method and the communication network according to the subject matter of the invention for the administration of subscriber data provides that a respective interface via which the information for the control of the outside subscriber data are transmitted is respectively established between a subscriber's own memory unit responsible for a subscriber and another memory unit.

The interface enabled between one's own memory unit and another memory unit not only enables a communication connection to one's own memory unit in a simple way but, proceeding therefrom, enables a communication connection to a further, central data base with outside subscriber data. Thus, for example, the information can be forwarded to the outside memory unit—for example, in a container message on the basis of a subscriber soft-input for a specific service—, in order to select the subscriber data of the other subscriber—for example, to have the service data of this service registered for the other subscriber in the other subscriber's memory unit. Such a service can, for example, be the "follow me" service wherein the calls to the telephone number of the other subscriber are routed to the subscriber that had the service entered in the outside memory unit via the established, new interface—preferably via an access authorization. It is thus possible to forward the information up to the outside memory unit, for example via the container message or messages. An information transmission—for example, for inquiry, expansion and/or modification of service data or for synchronization of subscriber data in various memory units that were hitherto not capable of maintaining a dialog for data exchange—is uniformly possible for all subscriber data that can be administered in at least two central data basis.

The subject matter of the invention can thereby be applied both for memory units for the administration of mobile subscribers of a mobile radio telephone network as well as for memory units for administering subscribers according to an intelligent network structure. In this latter instance, a service vendor can place a service control point in a communication network without having to demand that other vendors make a modification of their service logic or, respectively, service data in order to be able to use this service. The direct synchronization of the subscriber data in the various service control points makes this possible. The service control points selected first initiates the dialog to the other service control points via the respective interfaces in order to match the service handling for using the service to one another in all service control points. Thus, the "follow me" service cited above as an example could function via an IN platform (intelligent network) or CAMEL platform (customized application for mobile network enhanced logic) as operator-specific service without standardization outlay, functioning in a network-overlapping fashion, regardless of whether the subscriber is a mobile radio telephone network subscriber or a fixed network subscriber.

According to an advantageous development of the invention, the information for selecting the outside subscriber data are transmitted between respectively two memory units in at least one container message. The employment of the container message represents a future-proof transmission medium that packs the information—unmodified or modified or exchanged—into the container message and subsequently sends them regardless of whether the information arrive at the memory unit according to a functional signaling protocol or as unstructured USSD data (unstructured supplementary data).

It is advantageous according to a further development of the invention that a message is received by one's own memory unit with reference whereto it recognizes the interface via which the information are to be transmitted to the other memory unit. It is also advantageous that an access authorization for example, in the form of a password—for the access of a memory unit to the outside subscriber data is co-transmitted to another memory unit.

According to another advantageous development of the invention, information for synchronization of the subscriber data are transmitted from one's own memory unit to the other memory unit on the interface. Preferably, the service data of a service relating to a plurality of subscribers are administered in a plurality of memory units and are synchronized with one another by the information transmitted on the respective interfaces. The automatic synchronization of the subscriber data, particularly of the service data in a preferred development of the inventive method relates to a service (mobile access hunting) wherein a call arriving in the communication network and directed to a group of subscribers is only forwarded to the subscribers who can be reached, this being identified by interrogating the subscriber data in the memory units via the respective interfaces. The advantage is comprised therein that it is no longer necessary to administer all members of the group in a single home register.

According to an especially preferred application of the invention, the subscriber selects, a service on the basis of the subscriber self-input and this is transmitted to his own memory unit, this signaling that the communication connections relating to some other subscriber are to be forwarded to him. One's own memory unit determines in a next step that the other subscriber is registered in an outside memory unit. Subsequently, the service is registered in the outside memory unit for the other subscriber via the interface.

Preferably, the service together with an identification information for identifying the memory unit responsible for the other subscriber is transmitted from the communication terminal equipment to the communication network. In the communication network, the service together with the identification information for identifying the memory unit responsible for the other subscriber and with an identification information for identifying the subscriber effecting the subscriber self-input, is transmitted to the appertaining memory unit. This latter identification information is added by a network equipment preferably by the memory unit receiving the service first, i.e. one's own memory unit. Advantageously, the mobile subscriber telephone number of the respective subscriber is employed as identification number.

According to a development of the invention, a switching equipment whereat a call intended for the other subscriber arrives sends a connection set up request message to the appertaining memory unit and receives an information about the registered service with an identification information for identifying the subscriber to whom the call is to be rerouted as response. The service registered in the outside memory unit for the other subscriber can thus be called and initiated in the connection setup. Following thereupon, a connection setup message to a switching equipment responsible for the identified subscribe is preferably sent on the basis of the arriving information in order to achieve the routing to the subscriber who manipulated the outside data base.

The subject matter of the invention is explained in greater detail below with reference to graphic illustrations.

Figure 2:
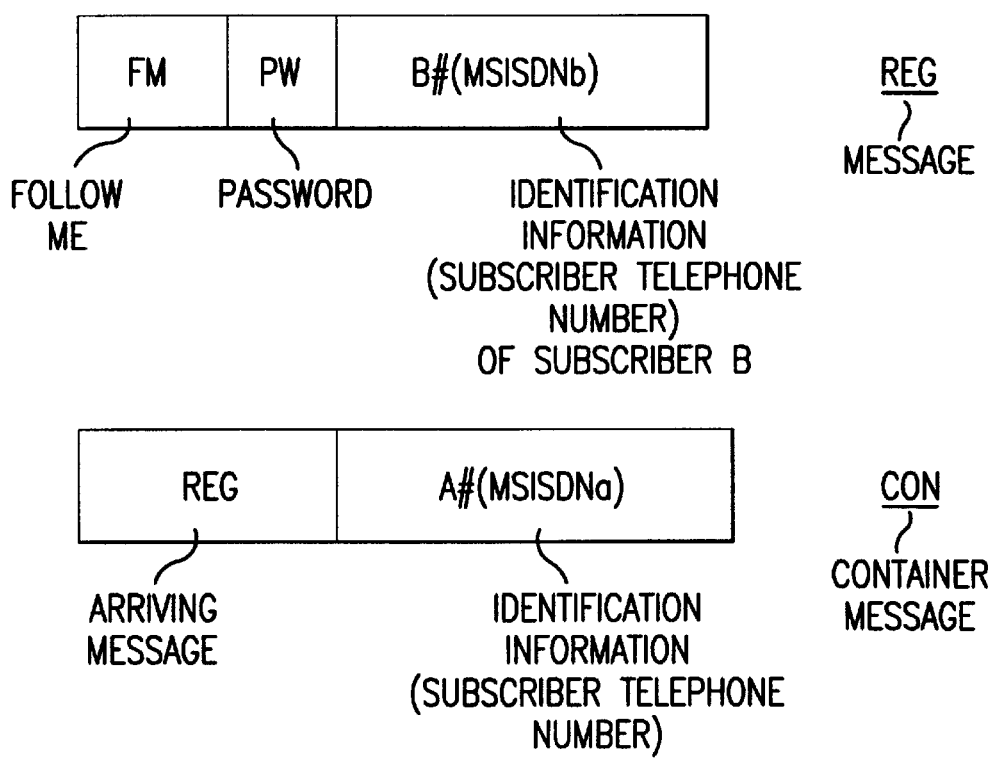
Figure 3:
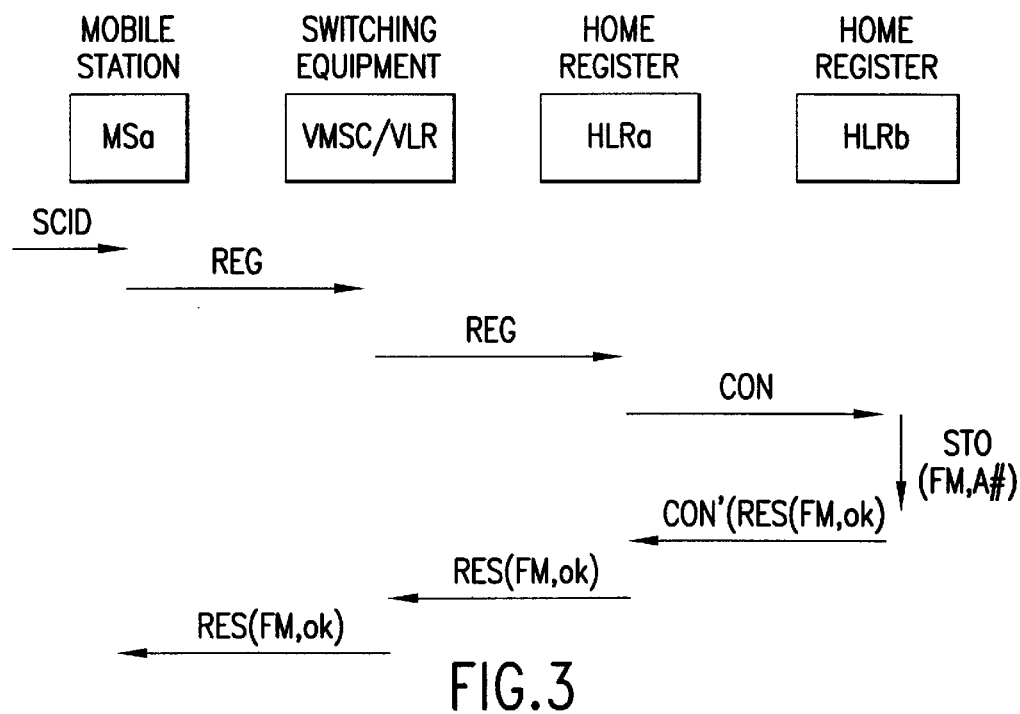
Figure 4:
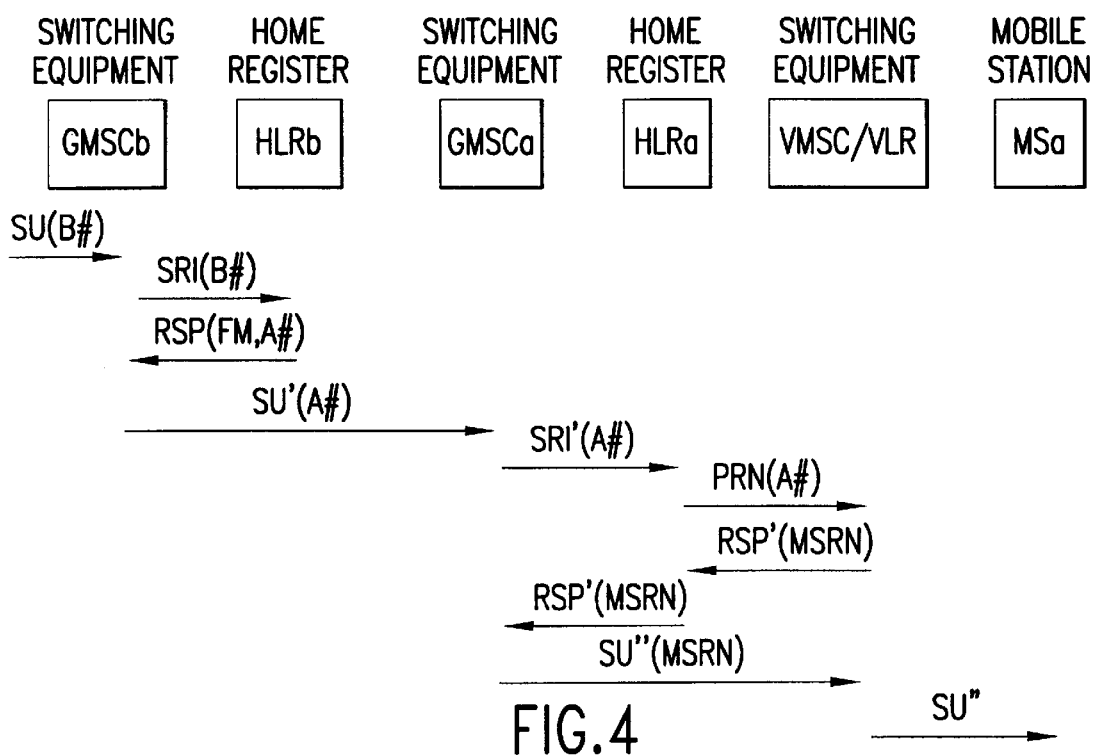
Figure 5:
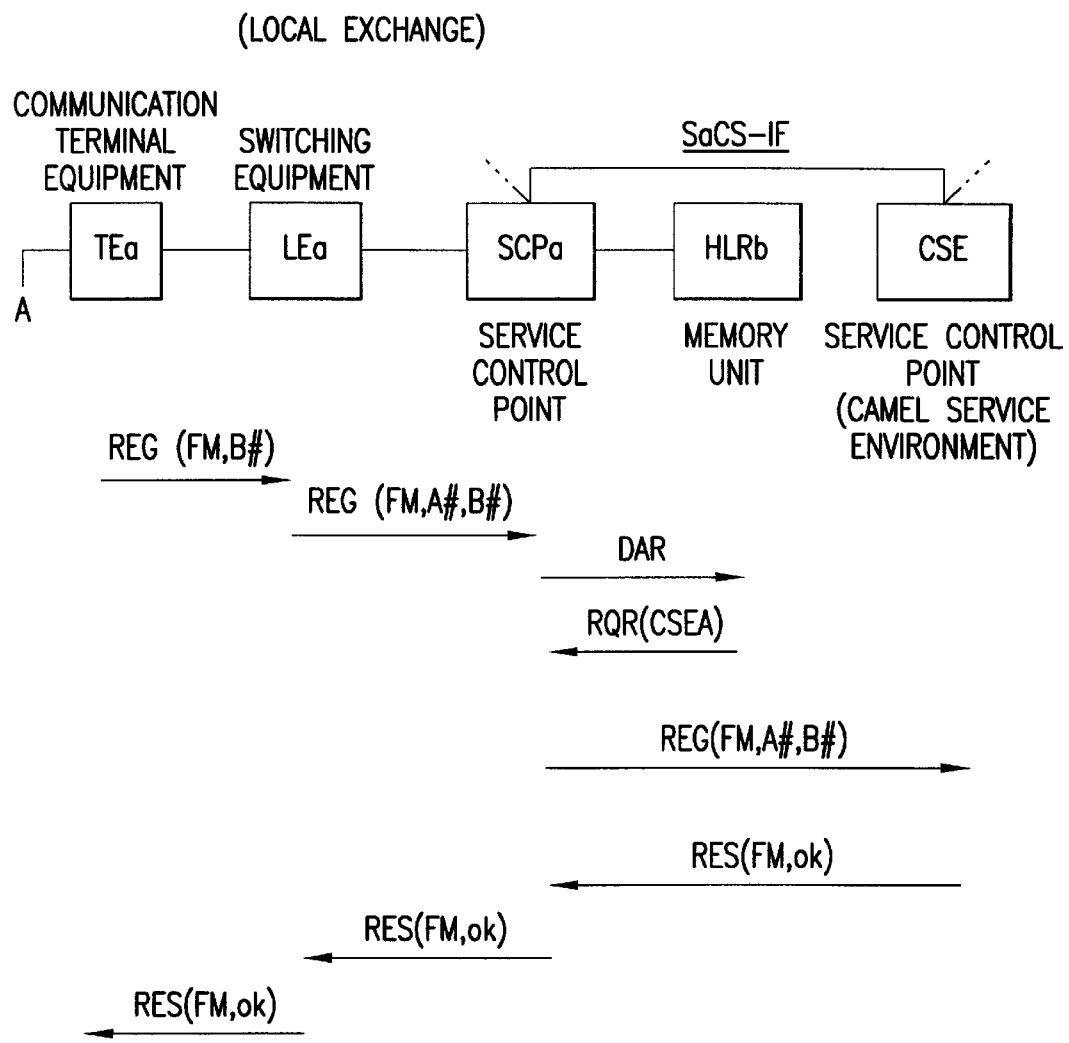

Thereby shown are:

FIG. 1 the block circuit diagram of a mobile radio telephone network wherein the inventive method for administering subscriber data for mobile subscribers sequences;

FIG. 2 an exemplary compilation of messages for the registration of a specific service for a subscriber in an outside home register;

FIG. 3 a schematic illustration of the devices of a mobile radio telephone network participating in the registration of the service with the message flow required for the administration of the subscriber data;

FIG. 4 a schematic illustration of the connection setup given a call incoming in the mobile radio telephone network and registration of the service in the home register; and FIG. 5 a schematic illustration of the devices of a communication network supporting the intelligent network structure participating in the registration of the service, together with the message flow required for the administration of the subscriber data.

The inventive method and communication network is described with reference to the example of a mobile radio telephone network GSM according to the standard of the same name that is shown in FIG. 1. A fixed network that supports the IN network structure (intelligent network) with service control points and wherein the subject matter of the invention can likewise be implemented is not shown as a block circuit diagram; however, FIG. 5 shows the essential network equipment and their collaboration.

The communication network KN in FIG. 1 comprises a plurality of switching equipment—for example, the switching equipment VMSC/VLR, MSC/VLR, GMSCa, GMSCb are shown—that are connected to one another. The switching equipment VMSC/VLR produces a communication connection to a mobile subscriber A via a base station BS that is connected wire-bound to the switching equipment and via an air interface between base station BS and a mobile station MSa. The mobile station MS is the communication terminal equipment of the mobile subscriber A. A further switching equipment MSC/VLR produces a communication connection to another mobile subscriber B via a further base station BS that is connected wire-bound to the switching equipment and via an air interface between base station BS and a mobile station MSb. The mobile station MSb is the communication terminal equipment of the mobile subscriber B. The switching equipment GMSCa and GMSCb respectively form a network interworking into a further network, for example a public telephone network PSTN.

According to FIG. 1, a memory unit HLRa is arranged in the mobile radio telephone network GSM as home register of the mobile subscriber A. It is an independent central data base that, in the present example, is connected to the illustrated switching equipment VMSC/VLR and to the switching equipment GMSCa. Another memory unit HLRb is arranged in the mobile radio telephone network GSM as home register of the mobile subscriber B. It is likewise an independent, dentral data base that, in the present example, is connected to the illustrated switching equipment MSC/VLR and to the switching equipment GMSCb. Dependent on the size of the radio coverage area to be covered, further home registers could be present and behave analogous to the illustrated memory units in view of the inventive method. The switching equipment VMSC/VLR and MSC/VLR of the momentary connections of mobile subscribers A, B respectively have a visitor register VLR allocated to them as temporary memory unit as long as the mobile subscriber A, B is located in their coverage area with his mobile station Msa, MSb. The memory units HLRa, HLRband VLR contain respective subscriber data that, among other things, also cover service data of the services respectively registered for the subscriber.

In addition to the possibility of being connected to a visitor register VLR for the exchange of data, the connection of the home register, for example HLRa, to another home register, for example HRLb, via an interface, for example HaHb-IF, is inventively possible in order to have a direct access to outside subscriber data that are not administered one's own home register. The subscriber data set for the subscriber A in his own home register HLRa thereby remains unaffected, whereas the subscriber date set for the subscriber B is modified in—as seen from the point of view of subscriber A—the outside home register HLRb.

Fundamentally, such interfaces could be established between all home registers via which there is access to outside subscriber data, including service data, in other, central memory units. Preferably, the mobile radio telephone-specific signaling protocol (MAP, mobile application part) already employed in the mobile radio telephone network GSM for communication of the memory units, for example, HLRa, VLR, is used as protocol and is expanded for the transmission paths onto the interfaces, for example HaHb-IF.

With an MMI operation (man-machine interface) at the mobile station MSa, the mobile subscriber A initiates a service controlled input SCI, as known, in order to administer a service that can be controlled by the memory unit HLRa. The mobile station MSa receives the information therefrom that a service control or handling is desired for a specific service, being desired by a subscriber A, and corresponding functions are to be implemented at the network side. The access to outside subscriber data in the present example refers to a non-GSM-standardized service, the "follow me" service that subscriber A would, like to register in the home register HLRb of the subscriber B. The selection should effect a modification of the subscriber data such that all communication connections relating to the subscriber B are automatically forwarded to the subscriber A, i.e. routed. The service controlled input SCI ensues, for example, on the basis of an USSD operation (unstructured supplementary services data) that is recognized by a USSD control unit USH in the mobile station MSa. On the basis of the service controlled input SCI, a dialog first begins with the home register responsible for the subscriber A, i.e. with his own home register HLRa.

A message REG with information for selecting the subscriber data is generated by the mobile station MSa and is transmitted via the base station BS to the switching equipment VMSC/VLR and from the latter to the home register HLRa. The information are thereby transmitted either according to a USSD format structure or according to a functional protocol with functional definition of the function to be implemented, for example "register the above service". Independently of the type of transmission, the message REG according to FIG. 2 contains an information FM (follow me) for identifying the specific service. For example, it can be composed of a service code with reference whereto the home register HLRa recognizes the service. The message, also indicates that the specific service is to be registered with corresponding service data for a different subscriber. The different subscriber B can be recognized by the home register HLRa with reference to an identification information B# co-transmitted in the message REG according to FIG. 2, which also allows conclusions to be made about the home register. HLRb responsible for the subscriber B. Preferably, the identification invasion B# is composed of the subscriber telephone number MSISDNb of the mobile subscriber B. By interpreting the message REG in a control means HSE, the home register HLRa recognizes that it is a matter of registering the service "follow me", and that the subscriber data of the subscriber B are not administered in the home register HLRa. Over and above this, it can derive from the message REG, i.e. with reference to the identification information B#, that the home register HLRb is responsible for the subscriber B and, thus, the interface HaHb-IF is utilized for the information transmission. Over and above this, the message REG contains a password PW that is used and interpreted at the reception side for the access authorization to the other home register HLRb—for example, by comparison to a rated password.

Thereupon, the home register HLRa packages the received message REG—either unmodified or modified— into a container message CON and sends this together with an identification information A# for the identification of the subscriber A to the home register HLRb via the interface HaHb-IF. The identification information A# is likewise preferably composed of the subscriber telephone number MSISDNa of the subscriber A. The identification information A# can also already be inserted into the message REG by the switching equipment VMSC/VLR. The fundamental structure of the container message CON given forwarding of the unmodified message REG is shown in FIG. 2. When a modification of the arriving message REG or a replacement by some other message ensues, the modified or new message is sent in the container message CON. The container message CON comprises, for example, a header field that identifies the message as container message, a data field with the information as well as a length field that indicates the message length. The information contained in the received container message CON is analyzed by a control means in the home register HLRb, and the service "follow me" for routing all connections directed to the subscriber B with the subscriber telephone number MSISDNb according to FIG. 2 is registered in a memory means HSS of the home register HLRb. The memory entry reserved for the subscriber B comprises service data that, for example, comprise the arrived information FM for defining the type of service and the received subscriber telephone number MSISDNa of the subscriber A according to FIG. 2.

As a supplement to the above example of a service registration, information for the synchronization of the subscriber data of one's own memory unit, for example HLRa, with the subscriber data of other memory units, for example HLRb, can also be transmitted between two respective home registers on the interfaces that are established. It is especially advantageous when the service data of a service relating to a plurality of subscribers are administered in a plurality of memory units and are synchronized with one another by the information transmitted on the respective interfaces. The automatic synchronization of the subscriber data sets, particulary of the service data, in a plurality of memory units can be applied, for example, to the service "mobile access hunting". In this service, a call incoming in a mobile radio telephone network GSM and directed to a group of subscribers is only forwarded to the subscribers that can be reached, this being identifiable by interrogating the subscriber data in the respectively effected memory units via the respective interfaces. The advantage is comprised therein that it is no longer necessary to administer all members of the group in a single home register. Given access to outside subscriber data—regardless of whether for registering a specific service or, for data synchronization—, it is advantageous to co-transmit an access authorization of the subscriber or of the network equipment that implements the selection in the respective messages. Such an access authorization can, for example, be composed of the password PW according to FIG. 2 (in the message REG), which can be interpreted in a simple way at the receiver of the message.

FIG. 3 shows a schematic illustration of the equipment of the mobile radio telephone network participating in the registration of the service described with reference to FIG. 1, together with the message flow required for the administration of the subscriber data. The network equipment are the switching equipment VMSC/VLR and the memory units fashioned as home registers HLRa, HLRb, supplemented by the communication terminal equipment in the form of the mobile station MSa. The mobile station MSa receives service control information data SCID from which it generates and sends the message REG. The appertaining switching equipment VMSC/VLR conducts the received message REG to the home register HLRa. The home register HLRa generates the container message CON and transmits it via the interface existing to the home register HLRb. A message STO in the message flow is intended to signal that the storing of the information FM and A# is to ensue internally. They form service data with which the described service for the selected. subscriber is implemented in his home register HLRb. In this way, the registration event initiated by a subscriber (A) for a service is executed by direct access to a home register—usually not accessible to him—and, thus, on the outside subscriber data. For a confirmation of the action, the home register HLRb generates a reply message RES that contains an information ok for identifying a successful registration and the information FM about the registered service. The reply message RES is in turn packed into a container message CON' and is transmitted on the interface to the home register HLRa. From the latter, the reply message RES proceeds via the switching equipment to the mobile station MSa. A display of the successfully implemented registration action for the subscriber (A) is possible.

FIG. 4 shows a schematic illustration of the connection setup given a call incoming in the mobile radio telephone network for that case wherein the registration of the service in the home register HLRb for the subscriber (B) has already ensued according to the procedure of FIG. 3. Let it thereby be assumed that the call was initiated, for example, by a calling subscriber in the public telephone network and a connection setup message SU (setup) with the called subscriber number B# of the B-subscriber is received by the switching equipment GMSCb. According to the standard, the switching equipment GMSCb directs a connection setup request message SRI (send routing info) with the subscriber telephone number B# to the suitable home register HLRb. As replied, it receives the message RSP with the information FM, A#, that are taken from the memory entry of the B-subscriber for the registered service "follow me". On the basis of the subscriber telephone number A# and the reference to the above, specific service, the switching equipment GMSCb sends a connection setup message SU' (setup) with the subscriber telephone number A# of the A-subscriber to the switching equipment GMSCa. The home register HLRa fetches a location telephone number MSRN (mobile subscriber roaming number) by standardized transmission of a message PRN (provide roaming number) that contains the subscriber telephone number A# to the switching equipment VMSC/VLR responsible at the moment for the A subscriber. The mobile subscriber roaming number MSRN is thereby transmitted in a reply message RSP' in response to the request. Given knowledge of the mobile subscriber roaming number MSRN, the switching equipment GMSCa initiates the connection setup to the A-subscriber in that a connection setup message SUP" (setup) is generated and sent to the switching equipment BMSC/VLR and from the latter to the mobile station MSa.

FIG. 5 shows a schematic illustration of the equipment of a communication network supporting the intelligent network structure that participate in the registration of the service, together with the message flow required for the administration of the subscriber data. The network equipment are a switching equipment LEa (local exchange) responsible for a line-bound A-subscriber to which the communication terminal equipment TEa (terminal equipment) of the A-subscriber is connected, a service control point SCPa connected to the switching equipment LEa, a further service control point CSE (CAMEL Service Environment) as well as a memory unit HLRb that stores the subscriber data for a mobile B-subscriber. The service control points SCPa, CSE respectively contain a control function (SCF, Service Control Function) for sequencing the service and a data function (SDF, service data function) for the data needed for handling the service. In the present example, the service control point SCPa is a matter of a unit to which an equipment of a fixed network is coupled, whereas the service control point CSE supports the CAMEL platform in a mobile radio telephone network. In order to enable a mutual communication for the administration of, too outside subscriber data, for example for data synchronization or for an access to service data of a specific service, a respective interface is established between two service control points. In the present example, an interface SaCS-IF exists between the service control point SCPa and the service control point CSE. As a result of the possibility of direct communication, the service control for a subscriber can also be distributed onto a plurality of service control points—deviating from the prior solution with a single service control point. A service control point SCPa or CSE is thus adequate for each service vendor at which he makes his services available without having to discuss with other service vendors at the same service control point when planning, introducing and/or using the service. When an access to a plurality of service control points is necessary for the administration of subscriber data of a subscriber, the addresses of the effected, other service control points are stored in a selected memory unit. For the present example, there is the possibility for the service control point SCPa of fetching the address of the other service control point CSE from the home register HLRb of the B-subscriber.

The example shown in FIG. 5 relates to the registration of the above described service "follow me". The fixed network subscriber A wishes to have this service entered for the mobile B-subscriber. He implements an input operation into the communication terminal equipment TEa that, in response thereto, initiates the message REG (register) with the information FM for identifying the service and the subscriber telephone B# of the B-subscriber and sends it to the switching equipment LEa. The switching equipment LEa adds the subscriber telephone number A# of the A-subscriber in the message REG and then forwards the modified message to the service control point SCPa. In order to proceed to the service control point CSE responsible for the mobile B-subscriber, the service control point SCPa requests the address of the service control point CSE from the home register HLRb. To this end, it sends an address request message DAR (data request) to the home register HLRb and receives a response message RQR (request response) the address information CSEA. [sic]

On the basis of the received address information CSEA, the service control point SCPa can send the message REG with the information FM, A#, B# to the correct service control point CSE. The service control point CSE registers the specific service for the identified B-subscriber by selecting the memory entry in the data function (SDF). In this way, the registration procedure initiated by the fixed subscriber (A) is implemented by direct access to the service control point CSE—usually not accessible to him—and, thus, to outside subscriber data of the mobile subscriber (B). For confirmation of the action, the service control unit CSE generates the response message RES that contains an information ok for identifying a successful registration and the information FM about the registered service. The response message RES is sent via the interface SaCS-IF to the service control point SCP*a*. From the latter, the response message RES proceeds to the switching equipment LE*a* and to the communication terminal equipment TE*a*. The successfully implemented registration action for the fixed network subscriber (A) is displayed at the communication terminal equipment TE*a*.

The above procedure enables a hierarchic service control according to an intelligent network structure, i.e. the service control point selected first establishes a dialog with one or more other service control points in order to implement the synchronization of the subscriber data or in order to sequence a service by, for example, access to new subscriber data in the other central data bases. Those standards need be defined for the synchronization of the subscriber data or the common use of specific service data according to the method of the invention. The service described with reference to the exemplary embodiment can be implemented via the IN platform (fixed network) or, respectively CAMEL platform (mobile radio telephone network) as operator-specific service without standardization outlay. In addition, the service also functions in network-overlapping fashion regardless of whether one of the subscribers is a fixed network subscriber or a mobile subscriber.

What is claimed is:

1. A method for administering subscriber data for network subscribers of a first communication network, comprising:

providing network switching equipment accessible by a plurality of network subscribers via communication terminal equipment and communicable with a second network;

storing network subscriber data of said network subscribers in the first network in a first memory unit of a first central database accessible by said network switching equipment and by said network subscribers via said network switching equipment;

storing network subscriber data of second network subscribers in a second memory unit of a second central database accessible by said network switching equipment and by said second network subscribers via said network switching equipment; and establishing, upon a self-entered request to said communication terminal equipment from said network subscriber in the first network, an interface between said first memory unit and said second memory unit via which information for selecting said second network subscriber data are transmitted.

2. A method according to claim 1, further comprising:

transmitting said information for selecting subscriber data in the second network in a container message between said first memory unit and said second memory unit.

3. A method according to claim 1, further comprising:

receiving a message by said first memory unit; and recognizing from said message, by said first memory unit, said interface via which said information are to be transmitted to said second memory unit.

4. A method according to claim 3, further comprising:

forwarding said received message unmodifies in a container message.

5. A method according to claim 3, further comprising:

modifying said received message by said first memory unit, wherein said modifying encompasses complete replacement; and transmitting said modified received message in a container message.

6. A method according to claim 1, further comprising:

transmitting synchronization information about the synchronization of said network subscriber data in the first network from said first memory unit to said second memory unit on said interface.

7. A method according to claim 6, further comprising:

administering service data of a service relating to a plurality of subscribers in a plurality of memory units; and synchronizing said plurality of memory units with one another by information transmitted on said respective interfaces.

8. A method according to claim 1, further comprising:

co-transmitting an access authorization for the access of said first memory unit to said subscriber data of said second memory unit.

9. A method according to claim 1, further comprising:

identifying reachable subscribers by interrogating said network subscriber data of the first network and said network subscriber data of the second network in said first memory unit and said second memory unit via said interfaces; and forwarding an incoming call in said first network that is directed to a group of subscribers to said identified reachable subscribers.

10. A method according to claim 1, further comprising:

selecting a service by said subscriber by subscriber self-input;

sending selected service information to said first memory unit, which signals that communication connections relating to said subscriber of the second network are to be forwarded to said subscriber;

determining by said first memory unit, that said subscriber in the second network is registered in said second memory unit;

sending selected service information via said interface; and registering said selected service information in said second memory unit for said subscriber in the second network.

11. A method according to claim 10, further comprising:

transmitting said selected service information for identifying said second memory unit responsible for said subscriber in the second network, by said communication terminal equipment to said first network.

12. A method according to claim 10, further comprising:

transmitting said selected service information in said first network together with both an other identification information for identifying said second memory unit responsible for said subscriber in the second network and, an identification information for identifying said first memory unit responsible for said subscriber effecting said subscriber self-input.

13. A method according to claim 11, whereby a subscriber telephone number of a subscriber is sent as identification information.

14. A method according to claim 10, further comprising:

sending, by a switching equipment at which a call intended for said subscriber of the second network arrives, a connection setup request message to said second memory unit; and receiving, as a response message said selected service information about said registered service together with an identification information for identifying said subscriber to whom said call is to be forwarded.

15. A method according to claim 1, further comprising:

forming said first memory unit and said second memory unit respectively by a first home register and a second home register for administering first subscriber data of a first mobile subscriber, and second subscriber data of an second mobile subscriber, respectively, of a mobile radio telephone network.

16. A method according to claim 1, further comprising:

forming said first memory unit and said second memory unit respectively by a service control point for administering said first subscriber data and said second subscriber data of a communication network supporting the structure of an intelligent network.

17. A method according to claim 16, further comprising:

requesting, by said service control point, said second memory unit to communication routing information that identifies an other service control point to which selected service information and both identification information and other identification for a selection of said second subscriber data are to be sent.

18. A first communication network for administering subscriber data for registered subscribers, comprising:

network switching equipment accessible by a plurality of network subscribers via communication terminal equipment and communicable with a second network;

a first memory unit of a first central database for registering and storing first network subscriber data accessible by said network switching equipment and by first network subscribers via said network switching equipment;

a second memory unit of a second central database for registering and storing second network subscriber data accessible by said network switching equipment and by second network subscribers via said network switching equipment;

self-entered request data, entered by said first subscriber to said first memory unit via said communication terminal equipment, which allows administration of said first subscriber data; and an interface established between said first memory unit and said second memory unit via which information for selecting said second network subscriber data are transmitted.

19. A first communication network according to claim 18, comprising:

a controller is said first memory unit for sending information for a synchronization of said first subscriber data to said second memory unit via said interface.

20. A first communication network according to claim 18, comprising:

a transmitter used for sending subscriber service information about a service for a subscriber to said first memory unit that is selected by said first subscriber by said self-entered request data and that signals that the communication connections relating to said second subscriber are to be forwarded to said first subscriber;

a controller in said first memory unit used for determining that said second subscriber is registered in said second memory unit;

a memory store in said second memory unit used for registering a second subscriber service information about a service for said second subscriber received via said interface.

21. A first communication network according to claim 18, comprising:

home registers as memory units for the administration of mobile subscribers of a mobile radio telephone network.

22. A first communication network according to claim 18, comprising:

service control points as memory units for administering said first subscriber data of said first subscribers of a second communication network supporting the structure of an intelligent network.

\* \* \* \* \*